United States Patent [19]
Clark

[11] Patent Number: 5,175,720
[45] Date of Patent: Dec. 29, 1992

[54] INTERACTIVE OPTICAL DISK

[75] Inventor: Bryan K. Clark, Sunnyvale, Calif.

[73] Assignee: Tandy Corporation, Ft. Worth, Tex.

[21] Appl. No.: 357,506

[22] Filed: May 25, 1989

[51] Int. Cl.⁵ .......................... G11B 23/00; G11B 3/74
[52] U.S. Cl. ..................................... 369/94; 369/275.4
[58] Field of Search ............... 369/275.1, 275.2, 275.3, 369/275.4, 275.5, 284, 286

[56] References Cited

U.S. PATENT DOCUMENTS

| | | |
|---|---|---|
| 4,371,954 | 2/1983 | Cornet . |
| 4,430,659 | 2/1984 | Maffitt et al. . |
| 4,466,091 | 8/1984 | Takagi et al. . |
| 4,527,173 | 7/1985 | Gupta et al. . |
| 4,578,788 | 3/1986 | Ahn et al. . |
| 4,651,172 | 2/1987 | Watanabe et al. . |
| 4,703,469 | 10/1987 | Pettigrew et al. . |
| 4,709,363 | 11/1987 | Dirks et al. . |
| 4,719,615 | 1/1988 | Feyrer et al. . |
| 4,769,802 | 9/1988 | Tatsuguchi ......................... 369/32 |
| 4,825,430 | 4/1989 | Halter et al. . |
| 4,852,077 | 7/1989 | Clark et al. ........................ 369/286 |
| 4,855,992 | 8/1989 | Ikegawa et al. . |
| 4,879,709 | 11/1989 | Clark . |
| 4,896,314 | 1/1990 | Skiens et al. ...................... 369/284 |
| 4,918,682 | 4/1990 | Finegan . |

FOREIGN PATENT DOCUMENTS 0136070 4/1985 European Pat. Off. .
338776 10/1989 European Pat. Off. .

OTHER PUBLICATIONS

Hamada et al., "That's CD-R," Optical Data Storage 1989 Technical Digest Series, vol. 1, Conference Edition, pp. 45-48.
Hamada et al., "CD-compatible write-once disc with high reflectivity," SPIE vol. 1078 (1989) pp. 80-87.
Watkinson, "The Art of Digital Audio," Chapter 13, pp. 440-486, Focal Press (1988).
Hartman et al., "Erasable Bilayer Dye-Polymer Optical Recording Medium," pp. 155-158.
Miyaoka, "Digital audio is compact and rugged," IEEE spectrum (Mar. 1984) pp. 35-39.

Primary Examiner—Roy N. Envall, Jr.
Assistant Examiner—Nabil Hindi
Attorney, Agent, or Firm—Townsend and Townsend

[57] ABSTRACT

A method and apparatus for recording and reading both permanently stored information and user-supplied information on an optical disk are disclosed. The optical disk is provided with permanent information via pits in a substrate of the disk. User-supplied information is recorded in an expansion/retention layer adjacent the substrate. The permanent and user-supplied information may be read via laser beams having unequal wavelengths.

7 Claims, 2 Drawing Sheets (1) NORMALIZED TO $P_1$
(2) REDUCED INTENSITY

INTERACTIVE OPTICAL DISK

BACKGROUND OF THE INVENTION

1. Field of the Invention

The present invention relates to the field of recording media. In particular, one embodiment of the invention provides an optical disk upon which pre-recorded data or information and user-supplied data or information may be stored on the same optical disk.

2. Description of Related Art

Optical data storage media in the form of compact disks are well known as an alternative to long-playing records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long playing records. The process, referred to herein as the "mastering" process, starts by first polishing a plain glass optical disk. This disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photosensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, now known as the glass master, then undergoes nickel electrocasting, a process which is similar to that used in making analog phono records. A series of metal replications follow, resulting in a disk called a stamper. The stamper is equivalent to a photographic negative in the sense that it is a reverse of the final compact disk; that is, there are now bumps were there should be pits. This stamper is then used to make a pressing on a transparent polymer such as polyvinyl chloride, poly(ethyl-methacrylate) and polycarbonate. The stamped surface is then plated with a reflective film such as aluminum or other metal and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players.

Media on which data can be recorded directly on and read directly from have a different configuration and operate under a somewhat different principle. One example is described in U.S. Pat. No. 4,719,615 (Feyrer et al.) The medium disclosed in Feyrer et al. includes a lower expansion layer of a rubbery material which expands when heated. The expansion layer is coupled to an upper retention layer which is glassy at ambient temperature and becomes rubbery when heated. Both layers are supported on a rigid substrate. The expansion and retention layers each contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump. Reading or playback of the data is then achieved by a low intensity "read" beam which is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength which is absorbed by the retention layer and not the expansion layer. This beam heats the retention layer alone to a rubbery state where its viscoelastic forces and those of the expansion layer return it to its original flat configuration. The write, read and erase beams all enter the medium on the retention layer side, passing through retention layer before reaching the expansion layer.

Copending application Ser. Nos. 294,723, and 07/357,377 assigned to the assignee of the present application and incorporated herein by reference for all purposes, disclose a plurality of improved optical data storage media. In one embodiment the invention described therein includes an expansion layer, a retention layer, and a reflective layer. The reflective layer provides a double pass through the media for writing and erasing thereon.

It would be desirable to provide an optical storage media that would include both permanent data storage via pre-recording or write-once recording by a user as well as the ability to store user-supplied or erasable data.

SUMMARY OF THE INVENTION

An improved optical data storage method and apparatus is disclosed. The method and apparatus permit storage of write protected data and user-supplied data on the same disk.

In one embodiment an optical storage disk is provided with two areal regions. The first areal region is used for permanent or semi-permanent recorded information. The permanent information may be applied by way of a pressing process or the like during the manufacture of the disk. The second areal region includes a material which may written upon by a user. The second areal region is preferably an erasable media including, for example, a dye loaded expansion layer, and a retention layer for holding the expansion layer in an expanded state. Alternatively, the second region is a write-once read-many (WORM) media.

In another embodiment the invention provides an optical media which includes a first layer used to impress pre-recorded information such that it is permanent or write protected. A second layer of the media is provided which can be recorded upon by a user. In a preferred embodiment the second layer includes an expansion region and a retention region for holding the expansion region in an expanded state.

Information is read from the first layer and the second layer by separate mechanisms. For example information may be read from the first layer by differential absorption of a laser beam, while information may be read from the second layer by phase cancellation or absence of a reflected beam. Pre-recorded data and user-supplied data may be obtained substantially simultaneously and are automatically synchronized.

Accordingly, in one embodiment the invention comprises a first region, the first region comprising non-erasable, optically-detectable information; and a second region, the second region adapted to record user-supplied optically-detectable information. The storage medium in one embodiment is a substantially planar disk wherein the first region is horizontally displaced on said disk from said second region. Alternatively, the first region is a first layer of a substantially planar disk and the second region is a second, vertically displaced layer of the disk.

A method of fabricating a data storage medium is also provided. In one embodiment the method includes the steps of providing a substrate; providing vertically displaced regions on a surface of the substrate, the vertically displaced regions representing permanent optically-detectable information; and applying a user-recordable region on the substrate, the user-recordable region responsive to light of a first wavelength so as to represent optically-detectable user-supplied information.

In a preferred embodiment a method of reading user-supplied and permanently-stored information from an optical disk comprises the steps of directing a first read beam of a first wavelength to a location on an optical disk, the optical disk comprising a substrate having bumps representing the permanently-stored information in binary form; an expansion layer, the expansion layer absorptive of light of a wavelength of the first read beam; and a retention layer for holding the expansion layer in an expanded state, the expansion layer absorptive of a second read beam of a second wavelength; directing the second read beam to the location, the second read beam having the second wavelength; and based on an amount of the first read beam and the second read beam absorbed at the first location, determining if the user-supplied information and the permanently stored information are present at the location.

DETAILED DESCRIPTION OF THE PREFERRED EMBODIMENTS

An optical data storage medium and method of recording and reading information thereon is provided herein. The method and apparatus will find application in a wide variety of fields. Merely by way of example, the method and apparatus could be used for permanent, write-protected storage of software on an optical disk which is also used for permanent or temporary storage of user-supplied data or information. Alternatively, the method and apparatus could be used in the educational field. For example, the method and apparatus could be used for permanently storing recordings for use in a language laboratory and temporarily storing responses of a student. Other possible fields of use include the music industry, Japanese Karaoke, and the like. Further fields of use will be apparent to those of skill in the art upon review of the disclosure.

Figure 1:
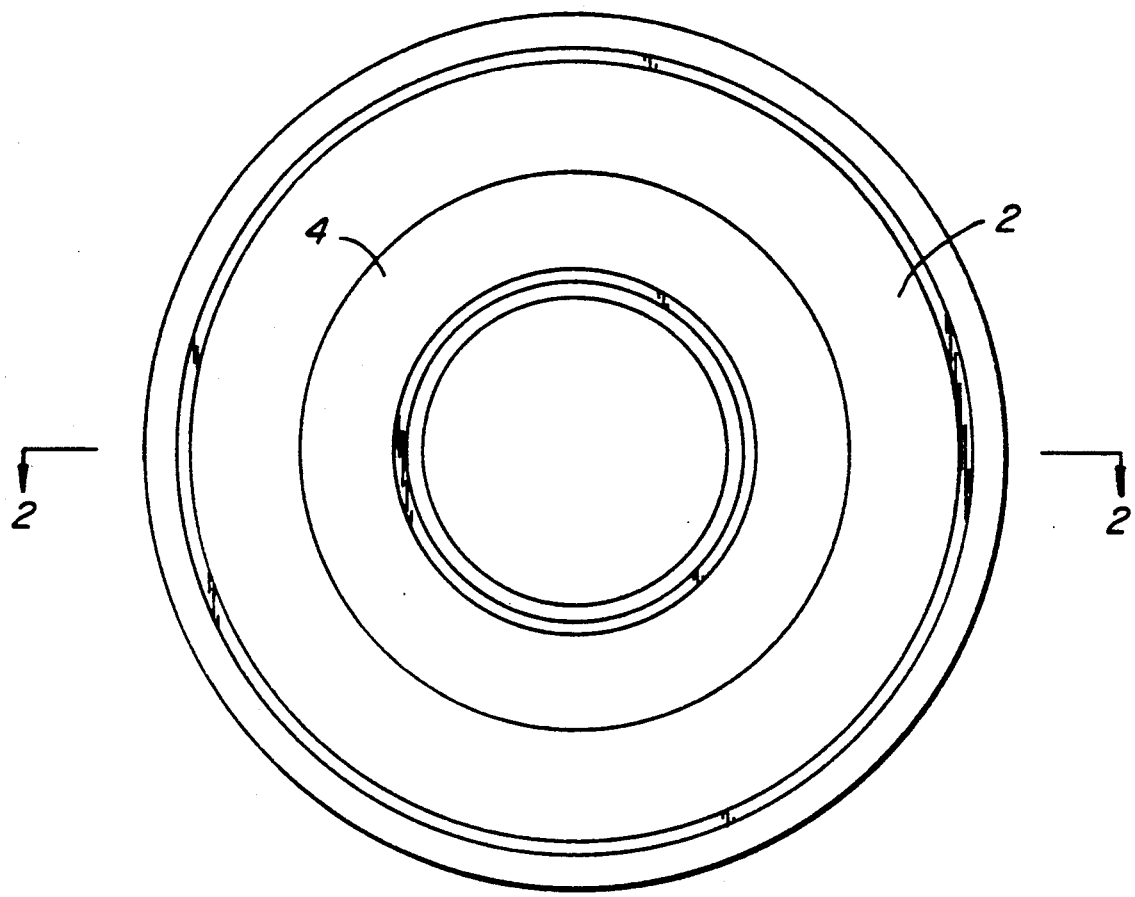
FIG. 1 illustrates a first embodiment of an interactive compact disk disclosed herein.
Figure 2:
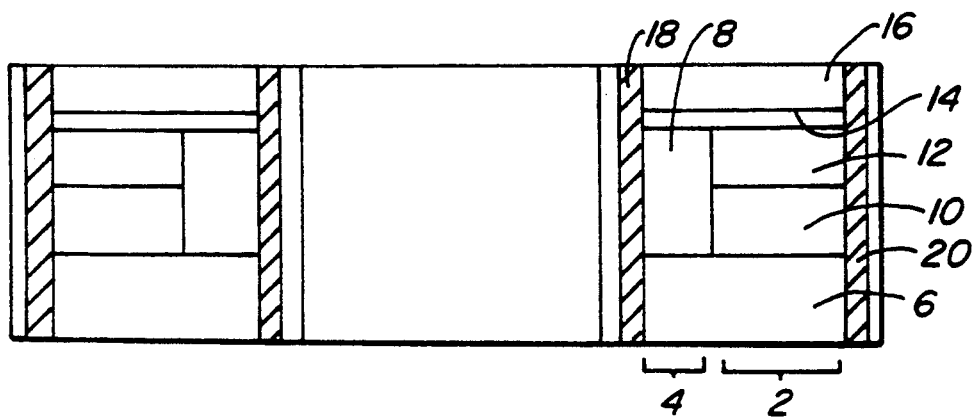
FIG. 2 illustrates the compact disk shown in FIG. 1 in cross-section.

FIGS. 1 and 2 illustrate one embodiment of an optical storage media which may be used in accord with the invention. In general the media includes a first areal region 2 and a second areal region 4. The first areal region 2 is used for temporary or permanent storage of user-supplied information such as software, data, voice recordings, or music recordings. The second region 4 is used for permanent storage of pre-recorded software, data, voice recordings, music recordings, or other information.

In a preferred embodiment the first region is an erasable media chosen from the media disclosed in copending application Ser. No. 294,723 (assigned to the assignee of the present invention and previously incorporated herein by reference). In a preferred embodiment the second region is of the type readily known to those of skill in the art and disclosed in, for example, Watkinson (cited above), which is incorporated herein by reference.

More particularly, as shown in FIGS. 1 and 2, the first region and the second region are both mounted on a substrate 6 which may be a transparent material such as, for example, glass, polycarbonate, or the like. The second region 4 includes a filler 8 or the like over the polycarbonate substrate. The region 8 may be, for example, only the retention layer, only the expansion material, combinations of the two, or another material, preferably dye loaded. Region 8 could, alternatively, comprise the material of the reflective region, which would enable the second region to be CD compatible.

The first region includes an expansion layer 10 on the substrate. Above the expansion layer, a retention layer 12 is provided. Above both the first region 2 and the second region 4 a reflective layer 14 and a protective layer 16 are provided. Sealing regions 18 and 20 are provided at the inside and outside edges of the disk.

The second region of the media is impressed with permanent information by a pressing process like the one described in Watkinson et al. Thereafter, the outer, first region of the disk is coated with the expansion and retention layers and the inner, second region of the disk is coated with the expansion, retention, and/or reflective materials. The reflective layer 14 is then provided over both the first and second regions. Similarly, the protective layer 16 is provided over the entire reflective layer. In preferred embodiments the expansion, retention, and reflective layers are selected from the materials disclosed in copending application Ser. No. 07/357,377, entitled "Recording Media," filed on the same date as the present application and incorporated herein by reference for all purposes.

In alternative embodiments the second region is a write-once read-many region. Such media include ablative materials and the like.

A disk playing and recording unit such as described in copending application Ser. No. 294,723 is then used to play and record information on the disk. Specifically, the unit will identify information in the second region in the same manner as it does with a standard compact disk. At one or more selected locations in the prerecorded information, a unique code is provided to permit the player to address any information that is recorded in the first region.

Of course, the invention has been described above primarily with reference to the use of erasable media using expansion/retention layers for recordation of user-supplied information, but it will be apparent to those of skill in the art that other media could readily be utilized. For example, magneto-optic media may be utilized in some embodiments. A separate recording head may be necessary if the two regions operate on different principles and, therefore, the embodiment shown in FIGS. 1 and 2 is preferred.

Figure 3:
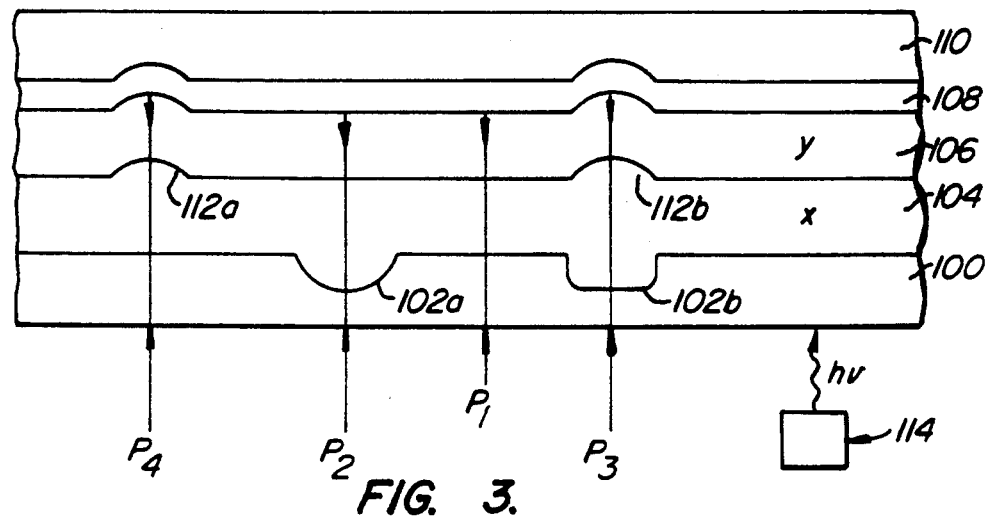
FIG. 3 illustrates an alternative embodiment of the invention in cross-section.

An alternative preferred embodiment of the invention is illustrated in FIG. 3, which shows a portion of recording media in cross-section. The embodiment shown in FIG. 3 provides a permanent data record on a first layer and coatings on the same areal region which are "active", i.e., layers on which a user may record and erase at will.

In general the disk includes a substrate or similar layer into which data bumps or marks $102a$ and $102b$ are impressed. The data marks 102 in the substrate may be created by conventional means known to those of skill in the art such as the pressing process or via a write-once read-many process. In a preferred embodiment the data bumps on the substrate are significantly deeper than on prior art compact disks for easier data processing. In a most preferred embodiment, the data bumps $102a$ and $102b$ are up to 6000 Å deep. In addition to providing a source of permanent data the pits may serve as a tracking guide for a recorder used in conjunction with the disk.

The substrate is preferably a clear or nearly clear material which provides protection to the media from outside forces and provides structural rigidity. Merely by way of example the substrate may be made of glass, polycarbonate, or the like. Other materials of construction will be apparent to those of skill in the art. In a preferred embodiment the substrate is polycarbonate and is about 1 mm thick.

Adjacent the substrate, an expansion layer 104 is provided. The expansion layer is formed of a material which (a) absorbs a percentage of light energy passing through it; (b) displays a high coefficient of thermal expansion, particularly when compared to the other layers of the medium; and (c) displays a high coefficient of elasticity to the extent that it will expand readily when heated at the temperatures encountered during a recordation process without exceeding its upper expansive limit and contract to its original flat condition upon cooling unless retained by the retention layer. When at room temperature, the expansion layer material should be near or above its glass transition temperature, which is preferably below 30° C. Coefficients of thermal expansion above about $1 \times 10^{-4}/°C$. are preferred, with those greater than about $5 \times 10^{-4}/°C$. particularly preferred and those greater than about $7.5 \times 10^{-4}/°C$. most preferred. The degree of absorptivity of light energy could be between 20% and 40% in the wavelength range from 850 nm to 650 nm such that the expansion layer may be heated with a write beam. To maintain the ability to read data recorded on the optical media on standard detection mechanisms, such as those found on conventional compact disk players, a maximum double pass absorption at the compact disk read wavelength (780 nm) of about 10% is most preferred. Accordingly, the expansion layer may be selected from the group epoxys, polyurethane, polymers, amorphous polymers, rubber, natural rubber, butyl rubber, silicone rubber, styrene-butadiene rubber, cellulose acetate, cellulose acetate-butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose, and mixtures thereof. In a preferred embodiment the expansion layer is selected from the materials disclosed in copending application Ser. No. 07/357,377, entitled "Recording Media". In one embodiment, the expansion layer is between about 1 micron or less thick.

Adjacent the expansion layer, a retention layer 106 is provided. The retention layer is formed of a material that (a) absorbs a percentage of light energy passing through it; (b) displays a glass transition temperature which is above room temperature; (c) is rubbery, when above its glass transition temperature, with sufficient elasticity to permit it to conform to the contour of the distortion formed in the second layer by the expansion of the first layer, when the first active material layer is heated; and (d) displays sufficient rigidity and strength below its glass transition temperature such that it will hold the expansion layer in an expanded condition, even though the first layer is cooled to ambient temperature. In preferred embodiments, the retention layer 106 is formed of material or combinations of materials which display at least some light absorption at the wavelength of an erase beam. The wavelength of the erase beam light may be chosen from a wide spectrum of available light wavelengths. The degree of absorptivity may vary from wavelength to wavelength and from retention material to retention material but may be for example about 30% to 45% at wavelengths between 650 nm and 860 nm. Accordingly, the retention layer may be made from epoxys, polyurethane, polymers, amorphous polymers, rubber, natural rubber, butyl rubber, silicone rubber, styrene-butadiene rubber, cellulose acetate, cellulose acetate-butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose, and mixtures thereof. In a preferred embodiment the retention layer is made in accordance with copending application Ser. No. 07/357,377, entitled "Recording Media" and assigned to the assignee of this invention. The thickness of the retention layer is approximately 0.5 to 1.5 microns in one embodiment. In a preferred embodiment, the retention layer is between about 0.5 and 1.0 microns thick.

Adjacent the retention layer, a reflective layer 108 is provided. Reflective layer 108 is a reflective material which serves to reflect light (e.g., more than 25% of the light striking it) back through the expansion layer and retention layer for the purpose of improved data recordation and data detection. During the recordation process the reflective properties of the reflective layer cause an entering light beam to double pass through the media, thus doubling the effective light beam path inside the media. Energy for the purposes of heating and thus expanding the various layers is thereby absorbed for both directions of the entering light beams. In preferred embodiments, the reflective layer is formed of materials such as gallium, aluminum, copper, silver, gold, indium, eutectic alloys of bismuth with tin or cadmium, or mixtures thereof.

A protective layer 110 may also be provided. The protective layer serves to absorb data bumps created in the expansion layer and protect the media from external forces. The protective layer may, for example, be made of glass or polycarbonate.

In order to record on the active layers, light (indicated by hv) is provided by a means for providing a light beam (114) which enters the substrate 100 and passes into the expansion layer 104, which layer absorbs significant amounts of energy at the wavelength of the light. Accordingly, the expansion layer is heated and expands into the retention layer, forming bumps (indicated by 112a and 112b). As shown, the data bumps may be either at the same location as data bumps in the substrate (as illustrated by bumps 102b/112b) or at different locations in the substrate (as illustrated by bumps 102a/112a).

A significant portion of the entering light is passed into the retention layer 106, which is also heated and softened, thereby accommodating the expansion layer more easily. Alternatively, the retention layer may be heated during writing primarily by conduction or the expansion layer may absorb light at a first wavelength (e.g., 680 nm) while the retention layer absorbs light at a second wavelength (e.g., 830 nm). Light may then be applied including both wavelengths, heating both layers simultaneously for writing a data bump. Conversely, for erasing, only the second wavelength is applied to the media, thereby heating, softening, and releasing the retention layer. In still another alternative embodiment, the layers absorb light as disclosed in copending application Ser. No. 152,690, which is incorporated herein by reference.

Differential absorption of light between the retention and expansion layer is obtained by dye-loading the layers with different dyes. Dyes or pigments which may be used singly or in combination are nigrosin blue, aniline blue, calco oil blue, ultramarine blue, methylene blue chloride, monastral blue, malachite green ozalate, sudan black BM, tricon blue, macrolex green G, DDCI-4, and IR26. In preferred embodiments the expansion layer is loaded with savinal blue and the retention layer is loaded with tricon blue and savinal blue.

The permanent data bumps 102a and 102b are read by a separate, but preferably substantially simultaneous, mechanism from user-supplied data bumps 112a and 112b. In particular, in one embodiment the permanent bumps 102a and 102b are read by differential absorption of an incoming "read" laser beam. At or near the same time, the user-supplied bumps are read by phase cancellation or absence of a reflected beam.

Figure 4:
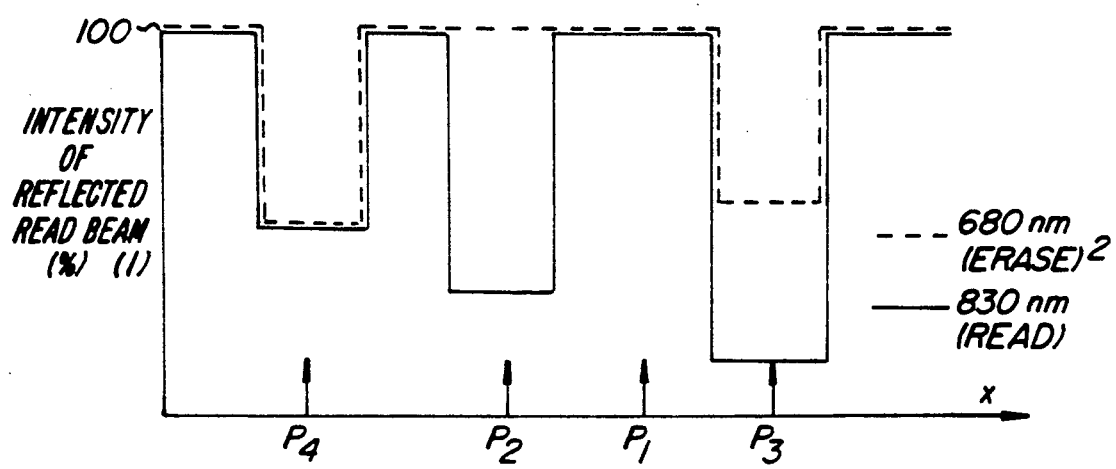
FIG. 4 qualitatively illustrates the light intensity of two reflected beams for the media illustrated in FIG. 3.

FIG. 3 illustrates four possible light paths into the substrate, i.e., $P_1$, $P_2$, $P_3$, and $P_4$. Light path $P_1$ passes through an area of the substrate that does not contain any information, i.e., there is neither a permanent bump or a user-recorded bump in path $P_1$. Light path $P_2$ passes through a permanent information bump, but not a user-supplied information bump. Path $P_3$ passes through both a permanent information bump and a user-supplied information bump. Path $P_4$ passes through only a user-supplied information bump. FIG. 4 illustrates (qualitatively) the intensity of 680 and 830 nm beams reflected from the media as a function of location.

The expansion layer 104 is provided with a first dye ("X") which absorbs light at a wavelength of the "read" or playback beam. In one preferred embodiment, the playback beam has a wavelength of about 830 nm. The retention layer is provided with a dye "Y" which does not absorb significant amounts of light at the wavelength of the read beam but which does absorb significant amounts of light at the wavelength of an "erase" beam. While the dye in the retention layer absorbs significant amounts of the erase beam, the expansion layer does not. The erase beam may be, for example, about 680 to 780 nm.

In preferred embodiments, the erase beam is also used for reading from the substrate, but its intensity is substantially reduced during reading operations. In a preferred embodiment, the erase beam is operated at about 10-15 milliwatts when erasing from the media but at about 1 milliwatt when reading from the media. It will be apparent to those of skill in the art that erasing and reading user-supplied data could be performed by providing two dyes in the expansion layer and using different wavelengths for reading and erasing, without departing from the scope of this invention.

In a read mode, the read laser in path $P_1$ (containing no data bumps) has its beam intensity reduced by an amount proportional to twice the thickness of the expansion layer 104 plus a small loss at the reflective layer 108, in the retention layer 106, and in the substrate 100. For purposes of illustration herein, losses at the reflective layer and in the substrate and retention layer are assumed to be small and in any event constant and are ignored.

In the read mode, the erase beam (operated at the reduced level) has a beam intensity loss proportional to the thickness of the retention layer 106. Light levels at a detector (not shown) for the erase beam and read beam resulting from path $P_1$ represent latent or zero signal intensity, i.e., binary zeros for the permanent and user-supplied data.

FIG. 4 qualitatively illustrates the intensity of beams reflected from the media as a function of location. The intensities of reflected beams at 680 nm (the erase beam wavelength) and 830 nm (the read beam wavelength) are shown as a function of distance along the substrate in FIG. 3. It is assumed that the reflected beam intensities along path $P_1$ are the baseline or 100% levels.

When the read beam and erase beam, supplied by means for providing such beams (114), are directed along path $P_2$, the read beam intensity is decreased significantly below the level of path $P_1$. In particular, the intensity of the beam is reduced by an amount proportional to twice the thickness of the expansion layer plus twice the depth of a permanent data bump. There will, however, be no additional attenuation of the erase beam along path $P_2$ as compared to path $P_1$. A reduced signal intensity of the read beam along path $P_2$ or lower, therefore, represents a binary 1, i.e., the presence of a permanent data bump, and the signal intensity of the erase beam continues to represent a binary 0 since 100% reflectance is observed.

When the read and erase beam are applied along path $P_3$, the read beam suffers not only an intensity loss due to the increased depth of the permanent data bump in the substrate, but also an intensity loss due to phase cancellation and light scattering due to the temporary, user-supplied bump. The erase beam will also detect the presence of a bump due to light scattering and phase cancellation. Along path $P_4$, both the read beam and erase beam suffer some loss due to scattering and phase cancellation due to the temporary bump only.

Therefore, it is seen that the erase beam and read beam each reflect distinctly different levels of light depending upon whether a permanent data bump or a temporary user-supplied data bump are present. A test for the absolute level of intensity of the reflected beam(s) can be used to determine whether information is erasable or non-erasable.

In particular, it is seen that if the reflected read beam is below some level (e.g., about 50% of the $P_1$ intensity), it is known that a permanent data bump is present. Similarly, if the intensity of the reflected erase beam (e.g., about 50% of the $P_1$ intensity), it is known that a user-supplied data bump is present. In some embodiments, it may be possible to use a single beam for detection and segregation of the data bumps, if sufficiently sensitive detection electronics are used since unique levels are reflected for each of the four paths from the reflected read beam. Further, in some embodiments it may not be necessary to segregate permanent and user-supplied data. Dual beams are preferred in order to obtain increased data resolution. Dual beams provide improved data detection, particularly if, for example, the data bumps are slightly offset or the like.

Table 1 provides qualitative reflected beam intensities, along with their corresponding indication of the presence of user-supplied and permanent data.

TABLE 1*

| Reflected Erase Beam Intensity | Reflected Read Beam Intensity | Permanent Data? | User-Supplied Data? |
| --- | --- | --- | --- |
| 80–100% | 80–100% | No | No |
| 0–80% | 80–100% | Yes | No |
| 80–100% | 0–80% | No | Yes |
| 0–80% | 0–80% | Yes | Yes |

*All values for reflectance are normalized to the "no-data" path.

It is to be understood that the above description is intended to be illustrative and not restrictive. Many embodiments will be apparent to those of skill in the art upon reviewing the above description. By way of example the invention has been illustrated primarily with reference to the use of erasable media for recording user-supplied information, but it will be readily apparent to those of skill in the art that WORM-type media could be used, although this would enable only a single use of the media in an interactive manner. Further, while the invention has been described with regard to particular wavelengths of light, the roles of these wavelengths of light could be reversed or different wavelengths of light could be used. The scope of the invention should, therefore, be determined not with reference to the above description, but should instead be determined with reference to the appended claims, along with the full scope of equivalents to which such claims are entitled.

What is claimed is:

1. Apparatus for selectively reading permanent information and user-supplied information from an optical disk comprising:
   a) an optical recording medium, said optical recording medium comprising:
      i) a substrate, said substrate comprising vertically displaced regions at first locations; and
      ii) an expansive region applied to said substrate over said vertically displaced regions, said expansive region absorptive of at least light of a first wavelength, and wherein said expansive region includes an expansion layer, said expansion layer absorptive of said first wavelength, and a retention layer, said retention layer absorptive of light of a second wavelength;
   b) means for providing at least a first read beam to said first location;
   c) means for receiving at least a first reflected read beam from said medium;
   d) means for determining the intensity of said reflected beam;
   e) means for determining if a permanent music, software, or voice information bump is present at said first location based on said intensity of said reflected beam;
   f) means for determining if user-supplied information is present at said first location; and
   g) means for providing a second read beam to said first location, said second read beam having a different wavelength than said first read beam, said first read absorbed in said expansion layer more than said retention layer, said second beam absorbed in said retention layer more than said expansion layer, and wherein:
      i) said means for determining if user-supplied information is present uses an intensity of a reflected second read beam; and
      ii) said means for determining if permanent information is present uses an intensity of a reflected first beam.

2. A method of reading user-supplied and permanently stored information from an optical disk comprising the steps of:
   a) directing a first read beam of a first wavelength to a first location on an optical disk, said optical disk comprising:
      i) a substrate having bumps representing said permanently stored information in binary form;
      ii) an expansion layer, said expansion layer absorptive of light of a wavelength of said first read beam; and
      iii) a retention layer for holding said expansion layer in an expanded state, said expansion layer absorptive of a second read beam of a second wavelength;
   b) directing said second read beam to said first location, said second read beam having said second wavelength; and
   c) determining if said user-supplied information and said permanently stored information are present at said first location.

3. The method as recited in claim 2 further comprising the step of recording user-supplied information at a second location on said optical disk said step of recording further comprising the step of directing a record beam at said expansion layer.

4. The method as recited in claim 3 further comprising the step of erasing user-supplied information at a third location on said optical disk, said step of erasing further comprising the step of directing an erase beam at said retention layer.

5. The method as recited in claim 4, wherein said erase beam has said second wavelength and wherein said erase beam has a higher intensity than said second read beam.

6. A method according to claim 2, wherein said first and second read beam wavelengths are different.

7. A storage medium comprising:
a) a first region, said first region comprising non-erasable, optically-detectable music, software, or voice information; and
b) a second region, said second region adapted to record user-supplied optically-detectable information, wherein said first region is a first layer of a substantially planar disk and said second region is a second, vertically displaced layer of said disk, wherein said first region is readable by a differential absorption mechanism, and said second region is readable by a phase cancellation mechanism.

* * * * *